US011622159B2

(12) United States Patent
Rengarajan et al.

(10) Patent No.: US 11,622,159 B2
(45) Date of Patent: Apr. 4, 2023

(54) MEDIA DATA MODIFICATION MANAGEMENT SYSTEM

(71) Applicant: International Business Machines Corporation, Armonk, NY (US)

(72) Inventors: Vikram Rengarajan, Irving, TX (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/362,320

(22) Filed: Jun. 29, 2021

(65) Prior Publication Data

US 2022/0417613 A1    Dec. 29, 2022

(51) Int. Cl.
*H04N 21/647* (2011.01)
*H04N 21/8355* (2011.01)
*H04N 21/258* (2011.01)
*H04N 21/24* (2011.01)

(52) U.S. Cl.
CPC ... *H04N 21/64715* (2013.01); *H04N 21/2407* (2013.01); *H04N 21/2585* (2013.01); *H04N 21/8355* (2013.01)

(58) Field of Classification Search
None
See application file for complete search history.

(56) References Cited

U.S. PATENT DOCUMENTS

| | | | |
|---|---|---|---|
| 10,338,913 B2 | 7/2019 | Franchitti | |
| 2007/0100829 A1* | 5/2007 | Allen | G06F 16/958 707/999.009 |
| 2007/0250715 A1* | 10/2007 | Cai | G06F 21/16 713/176 |
| 2008/0240490 A1* | 10/2008 | Finkelstein | H04N 21/235 382/100 |
| 2009/0259661 A1* | 10/2009 | Cragun | H04L 63/105 707/999.009 |
| 2013/0185285 A1* | 7/2013 | Shuman | H04L 51/04 707/722 |
| 2013/0304712 A1* | 11/2013 | Meijer | H04N 21/80 707/694 |
| 2013/0318347 A1* | 11/2013 | Moffat | H04L 67/306 713/168 |

(Continued)

OTHER PUBLICATIONS

Anonymous. "A Decentralized Architecture for Transparent and Verifiable Knowledge Manipulation in Untrusted Networks." Published Oct. 2, 2017, 8 pages. Published by IP.com. https://priorart.ip.com/IPCOM/000251032.

(Continued)

*Primary Examiner* — William J Kim
(74) *Attorney, Agent, or Firm* — Haley McClory

(57) ABSTRACT

A processor may manage media modification within a participant network. A processor may generate the participant network having a participant. The participant may be associated with one or more media data. A processor may enforce one or more rules on the participant network using an artificial intelligence (AI) based governance system. The one or more rules may manage the modification of the one or more media data by the participant. A processor may restrict the participant from modifying the one or more media data based, at least in part, on the AI based governance system.

20 Claims, 5 Drawing Sheets

(56) References Cited

U.S. PATENT DOCUMENTS

| | | | | |
|---|---|---|---|---|
| 2014/0176608 | A1* | 6/2014 | Boysen | A23P 20/15 |
| | | | | 345/633 |
| 2014/0181013 | A1* | 6/2014 | Micucci | G06F 16/90 |
| | | | | 707/610 |
| 2018/0181375 | A1* | 6/2018 | Hermet-Chavanne | |
| | | | | G06F 9/548 |
| 2019/0108292 | A1* | 4/2019 | Bowen | G06F 3/0482 |
| 2019/0179861 | A1* | 6/2019 | Goldenstein | G06F 16/367 |
| 2019/0197789 | A1* | 6/2019 | Macauley | G06Q 30/0252 |
| 2019/0372778 | A1 | 12/2019 | Palaniappan | |
| 2020/0007955 | A1* | 1/2020 | Mathur | H04N 5/2355 |
| 2020/0065526 | A1* | 2/2020 | Berman | G06T 1/0028 |
| 2020/0160502 | A1* | 5/2020 | Nießner | G06T 7/0002 |
| 2020/0162236 | A1* | 5/2020 | Miller | H04L 9/0643 |
| 2020/0265164 | A1 | 8/2020 | Siliprandi | |
| 2021/0194699 | A1* | 6/2021 | Tatonetti | H04L 9/3239 |
| 2021/0200903 | A1* | 7/2021 | Singh | H04L 9/3239 |
| 2021/0233204 | A1* | 7/2021 | Alattar | G06T 1/005 |
| 2021/0344498 | A1* | 11/2021 | Perunov | H04L 9/0637 |

OTHER PUBLICATIONS

Anonymous. "Artificial Intelligence for the Data-Driven Intelligent Enterprise." Published by Informatica. Redwood City, CA, USA.
Anonymous. "Autonomous Model Learning System for Model Based Solutions in Industrial Plants." Published Nov. 2, 2020. 5 pages. Published by IP.com. https://priorart.ip.eom/IPCOM/000264030.
Anonymous. "IBM Watson Machine Learning Accelerator." Printed Dec. 24, 2020. 8 pages. Published by IBM. https://www.ibm.com/products/deep-learning-platform.
Anonymous. "IBM Watson Studio." Printed Dec. 24, 2020. 12 pages. Published by IBM. https://www.ibm.com/cloud/watson-studio.
Anonymous. "Method and System for Obtaining Consensus on Artificial Intelligence (AI) Models Using Blockchain." Published Dec. 10, 2018. 3 pages. Published by IP.com. https://priorart.ip.com/IPCOM/000256561.
Anonymous. "System and Method for Enabling Transparency and Enforcing Compliance during AI Model Development Process using Blockchain." Published Jun. 12, 2019. 5 pages. Published by IP.com. https://priorart.ip.com/IPCOM/000258770.
Bezmalinovic, T., "When Merkel suddenly bears Trump's face: the dangerous manipulation of pictures and videos." Published Feb. 2, 2018. 5 pages. Published by Aargauer Zeitung. https://www.aargauerzeitung.ch/leben/digital/wenn-merkel-ploetzlich-trumps-gesicht-traegt-die-gefaehrliche-manipulation-von-bildern-und-videos-132155720.
Brown, S., "AI now can spot fake news generated by AI." Published Aug. 2, 2019. 3 pages. Published by CNET. https://www.cnet.com/news/ai-now-can-spot-fake-news-generated-by-ai/.
Cellan-Jones, R., "Stephen Hawking warns artificial intelligence could end mankind." Published Dec. 2, 2014. 5 pages. Published by BBC News. https://www.bbc.com/news/technology-30290540.
Clifford, C., "Elon Musk: 'Mark my words—A.I. is far more dangerous than nukes'." Published Mar. 14, 2018. 10 pages. Published by CNBC. https://www.cnbc.com/2018/03/13/elon-musk-at-sxsw-a-i-is-more-dangerous-than-nuclear-weapons.html.
Hasan, et al., "Combating Deepfake Videos Using Blockchain and Smart Contracts." Published Mar. 18, 2019. 11 pages. in IEEE Access, vol. 7, pp. 41596-41606. https://ieeexplore.ieee.org/abstract/document/8668407.
Mell, et al., "The NIST Definition of Cloud Computing," Recommendations of the National Institute of Standards and Technology, U.S. Department of Commerce, Special Publication 800-145, Sep. 2011, 7 pgs.
Novotny, P., et al., "Blockchain Analytics and Artificial Intelligence." Published Feb. 2019. 14 pages. IBM Journal of Research and Development. pp. 1-1. Published by ResearchGate. https://www.researchgate.net/publication/331241223_Blockchain_Analytics_and_Artificial_Intelligence.
Wiggers. "Deepfakes and deep media: A new security battleground." Published Feb. 11, 2020. 9 pages. Published by Venture Beat., https://venturebeat.eom/2020/02/11/deepfake-media-and-detection-methods/.
Wikipedia. "Cryptographic hash function." Printed Jun. 29, 2021. 14 pages. Published by Wikipedia. https://en.wikipedia.org/wiki/Cryptographic_hash_function.
Wikipedia. "Deepfake." Printed Dec. 24, 2020. 21 pages. Published by Wikipedia. https://en.wikipedia.org/wiki/Deepfake.
Wikipedia. "Fingerprint (computing)." Printed Dec. 24, 2020. 4 pages. Published by Wikipedia. https://en.wikipedia.org/wiki/Fingerprint_(computing).
Wikipedia. "Synthetic media." Printed Dec. 24, 2020. 15 pages. Published by Wikipedia. https://en.wikipedia.org/wiki/Synthetic_media.

* cited by examiner

US 11,622,159 B2

MEDIA DATA MODIFICATION MANAGEMENT SYSTEM

BACKGROUND

The present disclosure relates generally to the field of synthetic media, and more particularly to the modification of media data.

Media data may include any media such as video, images, audio, and/or multimedia. Synthetic media may include any media data which has been modified, either by a person (e.g., using computer software) and/or artificial intelligence (AI). While various industries, such as the entertainment and marketing industries, may benefit from generating synthetic media based off of the modification of media data, the generation of synthetic media may also be used for nefarious purposes.

SUMMARY

Embodiments of the present disclosure include a method, computer program product, and system for managing media modification within a participant network. A processor may generate the participant network having a participant. The participant may be associated with one or more media data. A processor may enforce one or more rules on the participant network using an artificial intelligence (AI) based governance system. The one or more rules may manage the modification of the one or more media data by the participant. A processor may restrict the participant from modifying the one or more media data based, at least in part, on the AI based governance system.

The above summary is not intended to describe each illustrated embodiment or every implementation of the present disclosure

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
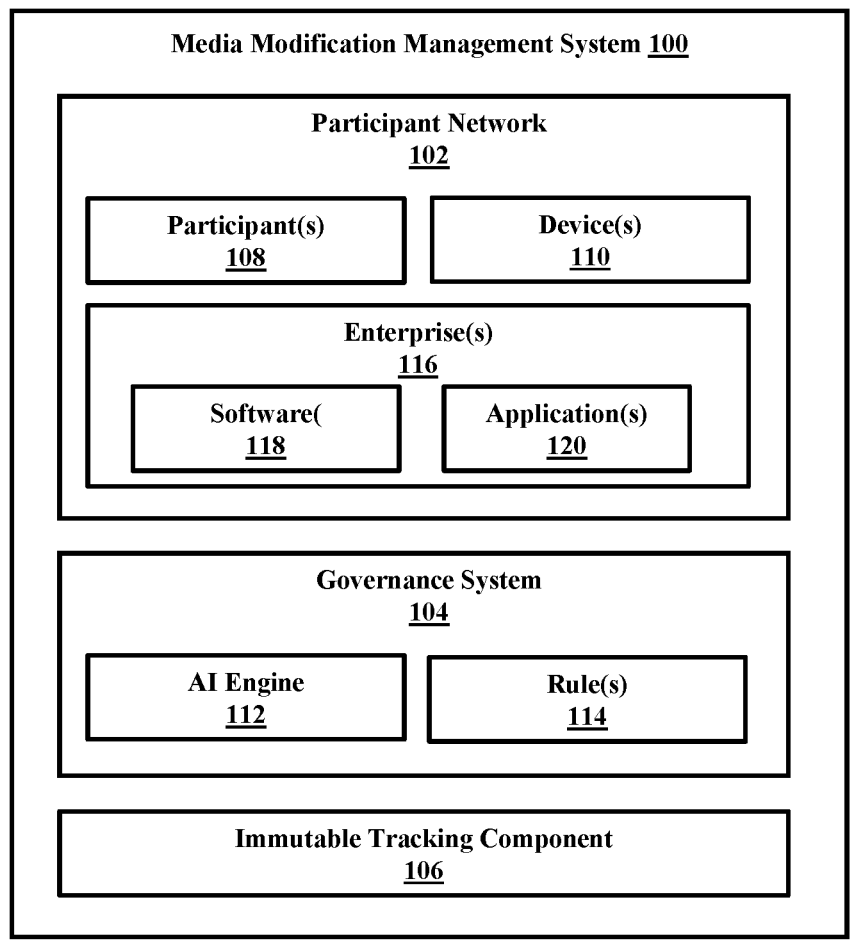
FIG. 1 depicts a block diagram of an embodiment of an media modification management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of synthetic media, and more particularly to the modification of media data. While the present disclosure is not necessarily limited to such applications, various aspects of the disclosure may be appreciated through a discussion of several examples using this context.

Media data may include any media format such as text (e.g., spreadsheets), video, images, audio, and/or multimedia. Synthetic media may include any media data which has been modified (e.g., altered, modified, transformed, etc.) from either its original form or another derivative of the original form. For example, a person may capture a video of their dog and upload the video to a software application that allows them to alter/modify the video (e.g., from the video's original form) to include audio (e.g., synthetic form). In this example when the video (e.g., synthetic media) is played, the dog may look like it is speaking. Continuing this example, the person could send this video to a friend who may alter the video further by modifying the video so the dog now looks like it is wearing a hat. In this example, the friend would be altering a derivative of the original form (e.g., already considered synthetic media) to form the synthetic media. While this example demonstrates a lighthearted side to synthetic media, advances in modification techniques have led to more nefarious synthetic media.

Developments in artificial intelligence (AI) and machine learning have enabled the production of high quality modified media data. While historical modification techniques have traditionally been identified by a person or through analysis as synthetic media, the production of high quality modified media data may use various AI techniques to alter the original media data in such a way as to confuse the public on what version is the original version. One such category of high quality modified media data are known as deep fakes. While there are positive connotations associated with deepfakes, they traditionally include the modification of an image or video to generate a false interpretation of the image or video. For example, a person may be captured on video presenting a nonconfrontational topic, but using AI and machine learning techniques (e.g., associated with music synthesis, text generation, human image/video synthesis, speech synthesis, etc.) the video may be modified to show the person presenting an offensive or confrontational topic. Such high quality media data modification often has the potential to deceive audiences and lead to confusion regarding what is true or false.

While efforts are being made to detect deepfakes or other types of synthetic media using AI, such detections are difficult because of the cyclic nature of AI. For example, when AI identifies an indicator of synthetic media it also learns what aspect of the synthetic media needs to be further modified in order to be convincing. As such, there is a desire for standards that may identify when media data has been modified, who has produced the modified media data, and restricting the generation of modified media data (e.g., synthetic media).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing media data modification within a participant network. Embodiments as contemplated herein, enable a participant or a set of participants of the participant network to manage the modification of media data based, at least in part, on a governance system. The governance system may enable the participant or a set of participants of a participant network to manage how media data may be modified. In embodiments, a governance system may be driven by an AI engine and may include one or more rules that regulate the modification of media data. While in some embodiments, the one or more rules may be applied equally to all of the participants of the participant network, in other embodiments, one or more rules may be applied disparately among participants of the participant network. In embodiments, a processor may generate the one or more rules of the governance system in a variety of ways including, but not limited to using an AI engine to autogenerate the rules or a participant or a set of participants (e.g., owner(s) of the media data) may manually generate the rules. The participant network contemplated herein can be customized to meet different participant or a set of participants needs.

In embodiments, a processor may generate a participant network among any number of participants. Participants may contribute to any process associated with the lifecycle of media data modification. For example, a participant may generate media data (e.g., taking a video with a mobile phone) or may modify data in some form (e.g., create a deepfake). In embodiments, participants who generate media data may be considered owners of the media data (e.g., hold the copyright to the media data). In some embodiments, a processor may also allow participants to purchase and/or license media data.

In embodiments, a processor may configure the participant network within a blockchain network (e.g., Hyperledger Fabric). In some embodiments, a processor may use the blockchain network to trace one or more actions (e.g., modification, editing, etc.) associated with the participant network. The blockchain may provide a ledger of the one or more actions of the participant network and may act as an immutable database that maintains an accounting of each participant and particular media data associated with the participant network. For example, each time a participant generates a media data, either through creating/capturing the media data or creating a derivative media data using modification techniques, metadata may be collected and automatically incorporated within the blockchain. This metadata may include, but is not limited to participant details (e.g., username, email, etc.), device details (e.g., device type, device identification, etc.), media data details (e.g., GPS location of picture taken), and what participants have viewed the particular media data.

In one example embodiment, a participant may capture or create an original image (e.g., using either a camera or digital painting software). Metadata may be collected regarding the device and/or software used to capture/create the picture, the participant's ownership of the original picture, participant details, and information associated with the original picture. In this example embodiment, the participant may decide to alter (e.g., modify) the picture from its original form by modifying the picture to include a new superimposed background. In embodiments, a processor may collect additional metadata associated with this new modified version of the media data and incorporate the additional metadata into the blockchain. This additional metadata could include details associated with the participant that performed the modification(s), details associated with the modifications and/or a modification category (e.g., simple, medium, or complex modification), and details associated with what devices and/or software/applications that may have been used to perform the modifications.

In some embodiments, a processor may collect additional metadata when a participant purchases, licenses a particular media data, or downloads a particular media data (e.g., associated with the participant network). The metadata and/or additional metadata that may be generated each time a particular media data is modified and/or each time a participant gains access to a particular media data. For example, a participant may gain access to media data through gaining some form of ownership rights. In some embodiments, once the metadata and/or additional metadata is incorporated into the blockchain, some or all of the metadata/additional metadata may be accessed by some or all of the participants of the participant network. Utilizing blockchain within the participant network creates an immutable ledger that may record information associated not only with the transition of ownership rights, but also a clear record of what participants performed the particular modifications. This may allow participants to observe how a particular media data has been modified from its original form.

In embodiments, a processor may generate a governance system to manage the modification of media data by enforcing one or more rules on the participants of the participant network. In these embodiments, a processor may configure an AI engine to perform various enforcement functions of the governance system. In embodiments, the AI engine may be configured to use various AI techniques and machine learning frameworks (e.g., autoencoders and generative adversarial networks) to perform the various functions of the governance system. These functions include, but are not limited to, the management/regulation of media data, security of media data, and authenticity of media data. In embodiments, a processor may configure the AI engine to analyze a modification of the one or more media data performed by a participant. In these embodiments, using the AI engine, a processor may determine if the modification performed on the media data violates one or more rules. In embodiments, one or more rules may be generated using various methods including, but not limited to, an AI rule engine (see below), a participant may manually define one or more rules associated with media data that they own or have ownership rights to, or any combination thereof.

A governance system may include, but is not limited to, rules that apply to every participant of the participant network, rules that apply to particular categories of participants, rules that are associated with a specific participant, or any combination thereof. In one example embodiment, a governance system may include a rule that applies to every participant stipulating that a participant must have valid permission from the owner of the particular media data prior to the participant performing modifications on a particular media data. In another example embodiment, a governance system may include a rule associated with a particular media data restricting the types of modification a participant may perform on the media data. For example, a participant may be allowed to modify a video by adding different filters to the video images, but may not be allowed to modify the video my altering the audio associated with the video. In some embodiments, a processor may provide an owner exception to a modification that violates the one or more rules. For example, in embodiments where a processor a analyzes a modification of a media data performed by a participant and determines the modification violates one or more rules, a processor may identify the participant as the owner of the media data. In these embodiments, where the participant violating the one or more rules is the owner of the media data, a processor may bypass the one or more rules and allow the owner to perform the modification.

In many embodiments, as contemplated herein, the enforcement of the one or more rules associated with a particular media data can only be managed if the media data is maintained within the participant network. As such, another example of one or more rules may include preventing the media data or an unsanctioned export (e.g., without the owner's approval) of the particular media data from the participant network. For example, in some embodiments, the AI engine may be able to detect if a participant is capturing a screen shot or screen recording of the media data or if a participant is attempting to remove the media data into a cloud storage device (e.g., external system) not recognized by the participant network. In these embodiments, the processor may prevent such actions and issue a warning message (e.g., alert notification).

In some embodiments, a processor may analyze one or more attempted transfers of media data. In these embodiments, a processor may analyze if a participant is attempting to use a messaging application, email, memory cards, Bluetooth, airdrop, and/or any other method of transferring media data using hardware and/or software/applications. In embodiments, a processor may restrict some or all of the aforementioned transfers based, at least in part, on if the transfer and/or transfer type violates the one or more rules. In these embodiments, if a processor determines that one or more rules have been violated either based on the transfer or particular type of transfer, a processor may issue an alert notification and prevent the transfer from occurring. In some embodiments, a processor may prevent the transfer of a particular media data based, at least in part, on the type of metadata (e.g., all the different types of metadata contemplated herein) compiled and recorded in the blockchain. In these embodiments, a processor may analyze the various metadata types recorded in the blockchain and determine if the media data adheres to one or more rules associated with the transfer of the media data.

For example, if a processor determines that there is missing metadata or metadata has been kept private (e.g., due to the participant's manually selected rules) a processor may prevent the transfer of the particular media data. In another example, one of the rules may include restrictions that prevent the transfer of media data when the level of modification exceeds a threshold level. In this example, a heavily doctored media data would not be able to be transferred while another version of the media data with a slight retouch may be allowed to be transferred. In some embodiments, a processor may send an alert notification to the participant initiating the transfer indicating that the transfer has failed. In some embodiments, if the participant attempting to send the failed transfer is the owner of the media data, the participant owner may be able to alter the one or more rules associated with the transfer and initiate the transfer again.

In embodiments, a processor may enforce (e.g., via the AI engine) the one or more rules associated with the governance system to determine when one or more rules may have been violated by a participant. In some embodiments, a processor may prevent a participant from violating the one or more rules by interacting with the device or software the participant is using to prevent the modification from occurring or being performed on the media data. In some embodiments, in addition to preventing the modification from occurring, a processor may configure the governance system to issue an alert notification each time a participant attempts to perform a modification that violates the one or more rules. In some embodiments, a processor (e.g., via the governance system) may send the alert notification to the participant who is violating the one or more rules and/or may send an alert notification to the owner(s) of the media data. In these embodiments, the alert notification may notify the participant of the rule(s) they are attempting to violate. In some embodiments, an alert notification issued to a participant may provide additional information. For example, an alert notification may include additional information stating that in order to perform a particular modification, the owner of the media data must first approve the particular modification. In this example, the additional information may include how such approval may be obtained from the owner.

In embodiments, a processor may configure the governances system to audit the participant network to determine if one or more rules have been violated. In some embodiments, this audit may be performed using the AI engine. In these embodiments, the AI engine may analyze the various media data generated by the participants' activities and involvement in the participant network. In such embodiments, a processor may analyze the information and data collected (e.g., metadata, additional metadata, violation metadata, etc.) from the participant network and identify if a participant has performed any actions associated with the of media data that may constitute a rule violation. In one example embodiment, a processor may identify that an image, owned by one participant, has plagiarized another participant and/or the image has been modified in such a manner as to violate the one or more rules. In such embodiments, a processor (e.g., via the governance system) may perform a dispute resolution analysis to aid in resolving the identified rule violations. For example, a dispute resolution analysis may be used to aid in the identification of the participant with the valid ownership rights by analyzing when the media data was generated and which image was generate/created first using the metadata and additional metadata collected and recorded in the blockchain.

In embodiments, a processor may collect and compile metadata associated with the rule violation, or violation metadata. Violation metadata may include, but is not limited to, metadata associated with the particular participant who violated the rule, how the rule was violated (e.g., what alteration was made to the media data that violated the one or more rules), how often the particular participant has had a rule violation, and/or what actions were taken to mitigate harm or damages associated with the violation. For example, if a participant generated a deep fake that exchanged the audio of a person giving a benign speech with offensive audio that violated the one or more rules, a processor (e.g., via the governance system) could be configured to permanently delete the deep fake.

In some embodiments, a processor may also collect violation metadata that includes what other participants, within the participant network, viewed the modified media data (e.g., nefarious deep fake). In embodiments where a deep fake or other modified media data violates one or more rules, a processor (e.g., via AI engine of governance system) may send an alert notification to each of the viewers indicating that the media data they saw was modified in such a manner that one or more rules were violated (e.g., with the intent to deceive). In some embodiments, the alert notification may include a link or copy of the media data in its unmodified form (e.g., original or modified version prior to the violation of the rules). Such embodiments may reduce the legitimacy of false narratives spread as factual information. In embodiments, violation metadata could be collected and incorporated into the blockchain to maintain a record of what rule violations of the one or more rules occurred and what participants were associated with the one or more rule violations.

In embodiments, as contemplated herein a processor (e.g., via governance system) may generate the one or more rules using a variety of methods. In some embodiments, a processor may utilize an AI rule engine to generate one or more rules. While in some embodiments, the AI rule engine is a subcomponent of the AI engine (e.g., The AI engine if trained to perform AI rule assignment) enforcing the one or more rules of the governance system, in other embodiments, the AI rule engine is a separately trained AI system. In embodiments, the AI rule engine may analyze historical data of the participant network, such as the various types of metadata and information compiled within the blockchain, to generate the one or more rules. In these embodiments, a processor may task the AI rule engine to identify one or more rules that may accomplish one or more system goals. For example, a processor could task the AI rule engine to develop rules that may prevent and/or limit the exposure of nefarious deep fakes throughout the participant network. In embodiments, the AI rule engine may produce one or more rules associated with particular participants, subsets of participants, all of the participants, or any combination thereof. While in some embodiments, a participant who generated or created the media data (e.g., owner of the media data) may be able define one or more rules that should be applied to their particular media data, in other embodiments, the AI rule engine may automatically generate a selection of rules that a participant/owner may select and customize the one or more rules that apply to the media data. For example, the AI rule engine could automatically generate Rule A, Rule B, and Rule C for a particular media data (e.g., image) and the participant/owner could select Rule A and Rule C to apply to their particular media data.

While embodiments discussed above provide an overview of managing modifications of media data, the following provides not only additional embodiments but also demonstrates additional features and variations regarding the aforementioned embodiments.

In embodiments, while a participant may include one or more individuals, in other embodiments, a participant may also include companies, business networks, enterprises, organizations, or any combination thereof. In some embodiments, a participant may include an enterprise/company engages in the manufacture and/or development of devices (e.g., mobile phones, cameras, laptops, etc.) that may be used modify media data. In these embodiments, users of such devices may be automatically incorporated into the participant network as a participant upon purchasing and/or using the device. For example, a device may require a participant (e.g., user of a device) to enter and/or create a login prior to using the device. This use of a login may incorporate the user of a device as a participant of the participant network.

In some embodiments, a participant may include enterprises/companies that develop software and/or applications that may enable a user to perform modification of media data (e.g., Adobe Photoshop®, TechSmith Camtasia®, Apple QuickTime®, Microsoft Office Suite®, etc.). In these embodiments, users who use such software and/or applications may be automatically incorporated into the participant network as a participant. For example, a user of a particular application that enables a user to modify media data may be required to enter and/or create a login to the application in order to perform such actions. This use of a login may incorporate the user of the software/application as a participant of the participant network.

In some embodiments, companies (e.g., participants) that develop software/application in areas which may involve indirect modification of media data may also be added to the plurality of devices of the participant network. Such software that could indirectly modify media data may include, but is not limited to, software tools for data warehousing, data science, data analytics, business intelligence, and machine learning (e.g., IBM Watson Studio®, IBM Cloud Pak for Data®, IBM DB2®, Azure Data Studio®, Google Refine®, TensorFlow®, IBM Watson®, Mockaroo®, etc.)

For example, in some embodiments, a participant who is a company, a business network, an enterprise, and/or an organization may be considered a participant and each individual user (e.g., of software/application and/or device) may also be a participant to the participant network. In these embodiments, a company, business network, enterprise, and/or organization participant may pre-build and/or embed techniques contemplated herein within the software/applications and/or devices. In some embodiments, a company, business network, enterprise, and/or organization participant may generate one or more rules that may automatically apply to the users (e.g., participants) of the software/applications and/or devices. In some embodiments, a company, business network, enterprise, and/or organization participant may generate a menu of one or more rules that may selected by participant users to apply (e.g., manage the modification) to media data that the participant user has captured or created. In some embodiments, the participant user of the software/applications and/or devices may generate their own one or more rules. In some embodiments, the AI rule engine may be configured to generate and/or recommend one or more rules for all participants or less than all participants who use the software/applications and/or devices developed/manufactured by a company, business network, enterprise, and/or organization participant.

As contemplated herein, to aid in the management of modifying media data, various data and metadata is collected (e.g., metadata, additional metadata, violation metadata, etc.). In embodiments, a participant user may limit or restrict the information and details (e.g., metadata) available to the company, business network, enterprise, and/or organization participant. In embodiments, a participant (e.g., participant user) may configure one or more preferences in software/application and/or device. While the participant may have the ability to restrict some information, media data created or modified (e.g., altered, doctored, modified, etc.) where specific details are restricted and not shared with the participant network may have a limited use. In embodiments, this may be based on how the company, business network, enterprise, and/or organization participant determines the one or more rules will apply to their users.

In embodiments, as contemplated herein, the participant network may be enhanced with an AI engine (e.g., IBM Watson®) to enforce the one or more rules of the governance system. In these embodiments, the governance system may be enabled with various AI and ML algorithms that may be trained with industry models (and others) to identify/catch and restrict the modification, particularly malicious and negative use, of media data in its various forms (e.g., deep fakes).

In embodiments, company, business network, enterprise, and/or organization participant may be able to define one or more rules for different types of software/applications and/or devices that may be configured to create, interact with, or handle different forms of media data. In embodiments, the one or more rules define how a media data may be doctored, altered, or modified (e.g., modified). In one example embodiments, media data, such as an image, may be created via a device, such as the camera manufactured in a mobile phone. In this example embodiment, the participant users may have the flexibility to restrict the information shared as metadata to the blockchain. In another example embodiment, a participant user may modify an existing media data (e.g., an image) using another device, such as a laptop. In these example embodiments, one or more different rules may apply to the particular scenario depending on the actions of the participant user.

In embodiments, as contemplated herein, one or more rules may be assigned to one or more participants of the participant network based, at least in part, on an AI rule engine (e.g., as part of the governance system). In embodiments, the AI rule engine may automatically generate one or more rules when one or more media data is created/generated (e.g., via a camera in a mobile phone). In embodiments, the one or more rules may be enforced by the AI engine of the governance system (as discussed herein). In these embodiments, the AI engine may use the information and data details incorporated into the blockchain (e.g., single point of truth) to enforce the one or more rules. While in some embodiments, a participant may be forced to comply with the one or more rules generated by the AI rule engine, in other embodiments, the one or more rules generated by the AI rule engine may be redefined and/or altered by the participant (e.g., either a participant user or a participant organization). In embodiments, this capability may be available to all data owners (e.g., participants) uniformly throughout the participant network, regardless of the use of different software/applications and/or devices used. For example, a participant user may use a mobile phone with a camera to capture a picture (e.g., media data). In this example, the one or more rules may be set to default (e.g., configured by the company that manufactures the mobile phone) during the creation process (e.g., taking the picture). Continuing this example when the participant user uploads the picture to a software/application program to modify the image (e.g., alter, modify, doctor, etc.) the governance system (e.g., using AI engine) may indicate that via the one or more default rules the image cannot be altered. But after analysis, the governance system may identify the participant user as the owner of the media data and allow the participant user to bypass the one or more rules restricting modification of the image. In some embodiments, the software/application may automatically identify the participant as the owner/creator of the media data. While in some of these embodiments, a processor may automatically update the one or more rules, in other embodiments the participant may alter the one or more rules (e.g., because they are the owner of the media data) and continue modifying the media data in the software/application. In embodiments where the participant alters the one or more rules, such information (e.g., metadata) is automatically updated and incorporated into the blockchain to ensure the most recent modification rules and permissions are recorded.

In embodiments, as contemplated herein, the AI rule engine may use historical data that includes system insights (e.g., specific tasks or modification process, participant details, past activity etc.). In embodiments, the AI rule engine may provide a seamless data modification process for participants of the participant network (e.g., media data owners, permitted users of media data, etc.). This seamless data modification process may be performed irrespective of the format of the media data (e.g., image, video, multimedia, etc.) regardless of where the modification process is performed, on a device or using software/application. In embodiments, the AI rule engine may be available (e.g., as a default) to participants that have a claim to ownership of the media data. In these embodiments, a participant may be able to manage the AI rule engine using an interface (e.g., of the software or device) that may interact with the media data.

In some embodiments, the AI rule engine may be continuously active and may dynamically define or alter the one or more rules associated with a particular media data. In some embodiments, the AI rule engine may dynamically alter the one or more rules when the participant (e.g., owner or permitted user of media data) performs a particular modification task on a particular media data. In one example embodiment, a participant who is the owner of an image, having no defined rules, may modify the image on their mobile phone. In this example embodiment, a processor (e.g., via governance system) may automatically access metadata from the participant such as, user details, device details, software details and other relevant data, that may be incorporated into the blockchain. In this example embodiment, the AI rule engine may automatically assign one or more rules associated with the particular modification on the mobile phone. If the participant were to decide to open the media data on a different application, the processor may still access the relevant metadata (e.g., any metadata as discussed herein) and the processor (e.g., via the AI engine and/or AI rule engine of the governance system) may enforce the one or more rules associated with the media data. In some embodiments, the generation of one or more rules may be performed on the backend of the operating system. Such embodiments may provide for the seamless modification of media data for the one or more participants of the participant network.

In some embodiments, a processor may configure the AI rule engine to assign one or more rules associated with managing media data may apply to individual participants, team participants, and/or to particular devices and/or software/applications. Such rules may be managed and enforced by the participant network (e.g., AI engine of the governance system). For example, a video presentation (e.g., media data) may be assigned one or more rules including, but not limited to, restricting the permission to modify the video presentation to a particular individual participant (e.g., a participant with a particular employee number), a specific group of participants performing a common function (e.g., the development team associated with cloud management), a group of participants having a specific permission level (e.g., company executives may perform modification), restricting the modification to only be performed on one device (e.g., identified with a serial number) and/or a particular type/group of device (e.g., mobile phone only, a group mobile phones with specific serial number's), restricting the modification to only be performed using a particular software/application program.

In some embodiments, a processor may assign one or more rules based on contracts available between participants of the participant network. For example, a marketing company participant may agree to represent a particular product (e.g., footwear) produced by the footwear company participant to market and generate awareness of the product. The agreement may include particular legal and business conditions that need to be addressed by each footwear company participant and the marketing company participant. In embodiments, a processor may use the AI engine of the governance system to generate one or more rules based, at least in part, on the contract or agreement between participants of the participant network. In these embodiments, by using the AI engine to generate the one or more rules based off of the contracts or agreements between participants, a processor may ensure that any modification performed on the media data is within the contractual terms of the agreement and may restrict any modification of media data that may result in a breach of contract or misuse of the media data of interest. Continuing the above example, a video of a famous athlete wearing a shoe designed by the footwear company participant cannot be modified by the marketing company participant to show falsely that the shoe makes the famous athlete faster if the contract included conditions associated with false representation of the product.

In some embodiments, a processor may limit the availability of media data based on the location of the participant. In some embodiments, this location based restriction may be based on a participant owner manually inputting the location restriction as a rule in the one or more rules. In other embodiments, such location restrictions may be based at least in part on conditions identified in a contract. For example, a contract between participant of the participant network may limit the availability media data and/or the type of modification processing that can be performed on the media data to a particular geographical area. This may be due to local copyright laws that differ depending on the country the participants may be conducting business in.

In embodiments, a processor may use the AI engine of the governance system to regulate and ensure the secure import/export or transfer of media data. In scenarios where a participant is attempting to import media data into storage software, data science and analytics tools, and/or any other tool or product that may handle media data, a processor may use the AI engine to determine if such actions violate the one or more rules. In such embodiments, a processor may issue one or more alert notification if the media data is being transferred to a location that violates one or more rules. For example, if a participant is attempting to transfer the media data to a party that is not part of the participant network, an alert notification may be issued and the participant who is attempting to transfer the media data may be prevented from performing such actions. In some embodiments, media data that is attempted to be transferred in such a manner as to violate the one or more rules may be filtered into a security vulnerable list or table. In some embodiments, an alert notification may include additional information associated with how and where the participant may transferer the media data and what features are available to the participant regarding the particular media data. For example, the additional how the media data can be modified and where specifically the media data may be transferred or stored.

In some embodiments, a processor may interact with media platforms (e.g., news outlets) and/or social media platforms (e.g., Facebook®, Twitter®, etc.) to provide authenticity results. In embodiments, a processor may be configured to generate a validation summary associated with a particular media data that may be used to prove and/or support authenticity. For example, some media data may not have one or more rules managing how the media data may be modified. In these scenarios, participants with access to the media data may be able to alter/modify the media data in any number of ways without violating any of the one or more rules. For example, a participant could generate a nefarious deep fake of a presentation using one or more particular media data components without violating any of the one or more rules. However, because the participant(s) are performing the actions resulting in the modification of the media data within the participant network, each action is maintained in the blockchain ledger. As such, in some embodiments, when a participant attempts to upload a media data to a media platform or social media platform, a processor may access the information incorporated in the blockchain (e.g., any metadata contemplated herein, such as metadata, additional metadata, violation metadata, etc.) and generate a validation summary that includes, at least, what modifications have been performed on the media data in its original form. The information in the validation summary may be available to all of the viewers, whether they are part of the participant network or not.

In embodiments, a processor may be configured to work with a social media platform. In some embodiments, if a participant restricts some or all of the various types of metadata from being recorded and incorporated into the blockchain, the participant will be prevented from uploading the media data to the social media platform. In other embodiments, the social media platform may restrict the media data uploaded to the platform and may prevent the participant from posting the video to the social media platform or limit how the media data is shared on the platform.

In embodiments, as contemplated herein, a company participant may be able to secure and ensure the veracity of media data and content based on the one or more rules (e.g., associated with managing modification, security). The one or more rules may be defined by an AI rule engine and/or manually defined by the company participant. For example, an offering team participant may be able to define the rules of modification associated with a spreadsheet of data (e.g., media data) to restrict based on a client's rules and make recommendations based on the client's personal preferences and past activity. In embodiments, this may include a warning (e.g., an alert notification) when a client participant is attempting to clear one or more datasets in the spreadsheet that violates the one or more rules (e.g., the client participant does not have permission to delete/clear the one or more datasets in the spreadsheet).

In one example embodiments, a participant of a participant network may record an original video of an interview with a particular device. Once the interview if finished the interview video is available on the particular device. In such embodiments, a processor may automatically collect metadata including, but not limited to, the interview video identifier, the particular device type (e.g., type of camera), user details (e.g., participant name), modification type (e.g., original or untouched), location (e.g., United States), Date captured, and one or more rules (e.g., default rules). This metadata may be recorded and incorporated into a blockchain associated with the participant network. In this example embodiment, the participant may decide to edit/modify the original interview video by importing the interview video to software/applications having modification capabilities. In embodiments, the participant may merge various marketing clips into the original interview video using the aforementioned software/application. In this example embodiment, the processor may automatically provide the software/application with the metadata previously collected by the processor.

The processor may automatically trigger alert notifications associated with the software/application. For example, if the metadata does not include who the owner of the interview video is, a processor may send an alert notification (e.g., pop-up message) indicating that one of the default rules is that only those with permission from the owner of the media data are able to modify the interview video. In embodiments, a processor may provide the participant with an ability to demonstrate that they are the owner. If the processor determines the participant is the owner of the interview video or has obtained the right to edit/modify the interview video, the processor may provide the participant with the option to bypass the rules and/or customize one or more rules. In some embodiments, the one or more rules may be a generic set of rules, while in other embodiments, the AI rule engine may generate the initial set of default rules. If the processor determines the participant is not the owner and has not obtained the right to edit/modify the interview video, the processor will prevent the participant from performing the planned modifications (e.g., merging marketing clips into the interview video).

In this example embodiment, if a participant decides to customize the one or more rules, a participant may select one or more rules that may restrict participants who have permission to perform the modification of the media data. For example, a participant may include, but is not limited to, one or more rules that limits the individuals who can perform modifications on the media data, rules that limit the devices and/or software/applications that may preform modifications on the media data, a specific group of individuals (e.g., anyone belonging to a particular group or team), a specific group of devices (e.g., only devices located at a particular location) may perform the modifications, or any combination thereof.

In embodiments, a processor may record the customized rules to the blockchain associated with the participant network. In these embodiments, the blockchain is continuously updated with the most recent information to ensure the blockchain maintains an accurate record of information. In embodiments, the software/application and/or device may be configured to have access to the various forms of metadata from the participant network. Continuing the above example embodiments, in embodiments where a participant is the owner of the media data and decides to customize the one or more rules, the software/application and/or device may receive this updated set of one or more rules and allow the participant (e.g., the owner) to perform the modifications. In some embodiments, a processor may configure the software/application to provide one or more recommendations associated with the modification of the media data. In these embodiments, the processor may base the one or more recommendations on the participants personal preferences, past activity, employer regulations, and/or employer security policies. For example, using the above example embodiments, a processor may recommend the use of particular marketing clips in the editing/modification of the interview video. In such embodiments, a processor may analyze and/or determine (e.g., via AI engine) if the participant has at any point (e.g., during the process of performing one or more modifications) violated one or more rules associated with the governance system. In embodiments, a processor may be configured to save the modified media data in a cloud storage system. While in some embodiments, a processor may configure a storage system where all participants may store and/or view media data associated with the participant network, in other embodiments, a processor may interact with other storage systems not directly associated with the participant network (e.g., cloud based storage systems, hard disk storage, etc.). In these embodiments, a processor may interact with the storage system (e.g., on the backend) and provide the storage system with access to the various forms of metadata (e.g., metadata incorporated in the blockchain) associated with the particular media data attempting to be saved. In these embodiments, when media data is saved alert notifications associated with the violation of one or more rules may still be issued.

In some embodiments, a processor may also use the AI engine to perform AI-driven production/modification of media data. In these embodiments, a processor may use the AI engine to derive insights and recommendations based, at least in part, on the participant's needs, such as the participant's need to satisfy a business client (e.g., based off of industry standards and target offerings, etc.). In embodiments, the AI engine may be configured to use text synthesis, natural language processing (NLP), deepfake/video synthesis, audio synthesis, generative adversarial networks, autoencoders, and any other processing or machine learning techniques that may aid in such recommendation processes.

In some embodiments, a processor, via the AI engine, may automatically generate a modified media data that can be used by the participant for a particular purpose, such as for a marketing campaign. For example, a processor using the AI engine may compile historical data, participant metadata, and participant insights to modify a video commercial in English and modify the video commercial to be used in a different country. For example, if the video commercial has an English speaking athlete promoting a type of footwear, the AI engine may modify the video commercial in such a way as the English speaking athlete now convincingly appears to be speaking German in a video commercial that will be used to advertise the footwear to people in Germany.

Referring now to FIG. 1, a block diagram of an media modification management system 100 for managing media modification within a participant network, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims. In some embodiments, the solar panels may be directed by the computing device to move to a more advantageous angle.

In embodiments, media modification management system 100 may include participant network 102, governance system 104, and an immutable tracking component 106. In embodiments, participant network 102 (e.g., business network) may include any number of participant(s) 108 and devices 110 as contemplated herein, that may contribute to the modification or production of media data. In some embodiments media modification management system 100 may also include enterprises 116. While in some embodiments, enterprises 116 may be considered a participant, in other embodiments, an enterprise 116 may be separate from the participants. In some embodiments, an enterprise 116 may include software 118 and applications 120.

In embodiments, governance system 104 may govern or enforce the participant network to ensure that only authorized modification is performed on the media data and that restricted modification of media data is prevented from occurring. In some embodiments, governance system 104 may include an AI engine 112. In these embodiments, AI engine 112 may analyze the participant network and perform one or more enforcement functions to manage the modification of media data. In some embodiments, AI engine 112 may also include an AI rule engine that may use AI and machine learning to generate one or more rules 114 associated with the media data. In these embodiments, one or more rule 114 may include standards associated with managing, restricting and/or enabling particular modifications of media data. In some embodiments, rule(s) 114 may be determined independently of AI engine 112. In these embodiments, the owner of the media data may select and determine what modifications may or may not be performed on the media data they own.

In embodiments, immutable tracking component 106 may act as a ledger to track users or machine (device or software or application) interactions with various media data. In some embodiments, the immutable tracking component 106 may be configured as a blockchain network. For example, immutable tracking component 106 may be configured as a Hyperledger Fabric blockchain network. Immutable tracking component 106 may be used not only to identify the owner of a particular media data, but also to identify what user or machine (device or software or application) has performed a particular modification.

Figure 2:
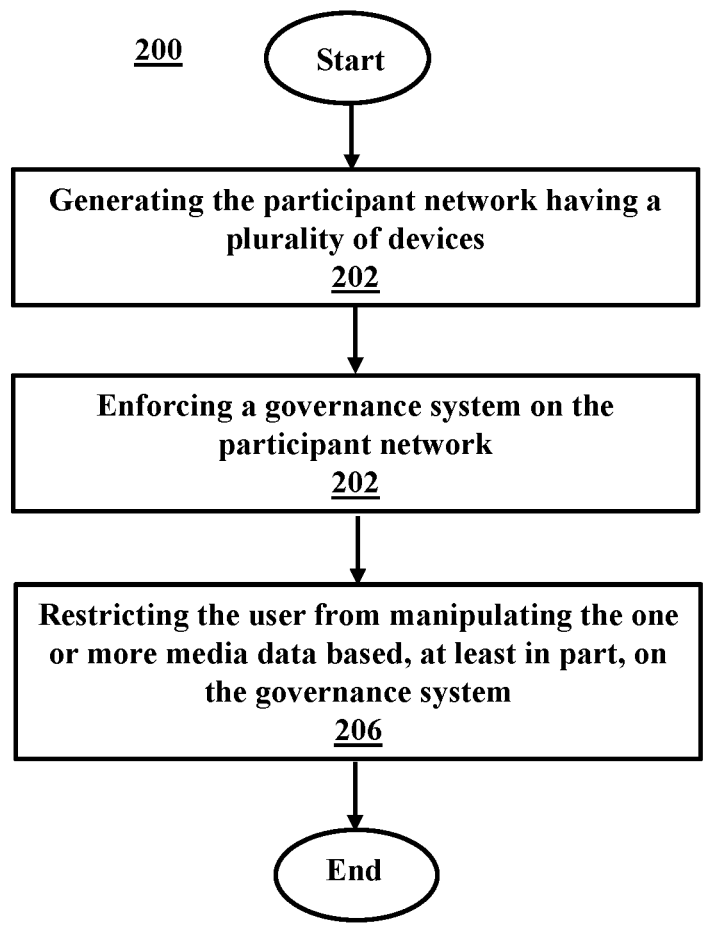
FIG. 2 illustrates a flowchart of a method for managing media modification, in accordance with embodiments of the present disclosure.

Referring now to FIG. 2, a flowchart illustrating an example method 200 for managing media modification within a participant network, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, the method 200 begins at operation 202 where a processor may generate a participant network having a plurality of devices. In embodiments, the plurality of devices may be associated with one or more media data and a user. In some embodiments, the method 200 proceeds to operation 204.

At operation 204, a processor may enforce a governance system on the participant network. In some embodiments, the governance system may include at least one rule to manage modification of the one or more media data by the user. In some embodiments, the method 200 may proceed to operation 206.

At operation 206, a processor may restrict the user from modifying the one or more media data. In embodiments, this restriction may be based, at least in part, on the governance system. In some embodiments, as depicted in FIG. 2, after operation 206, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
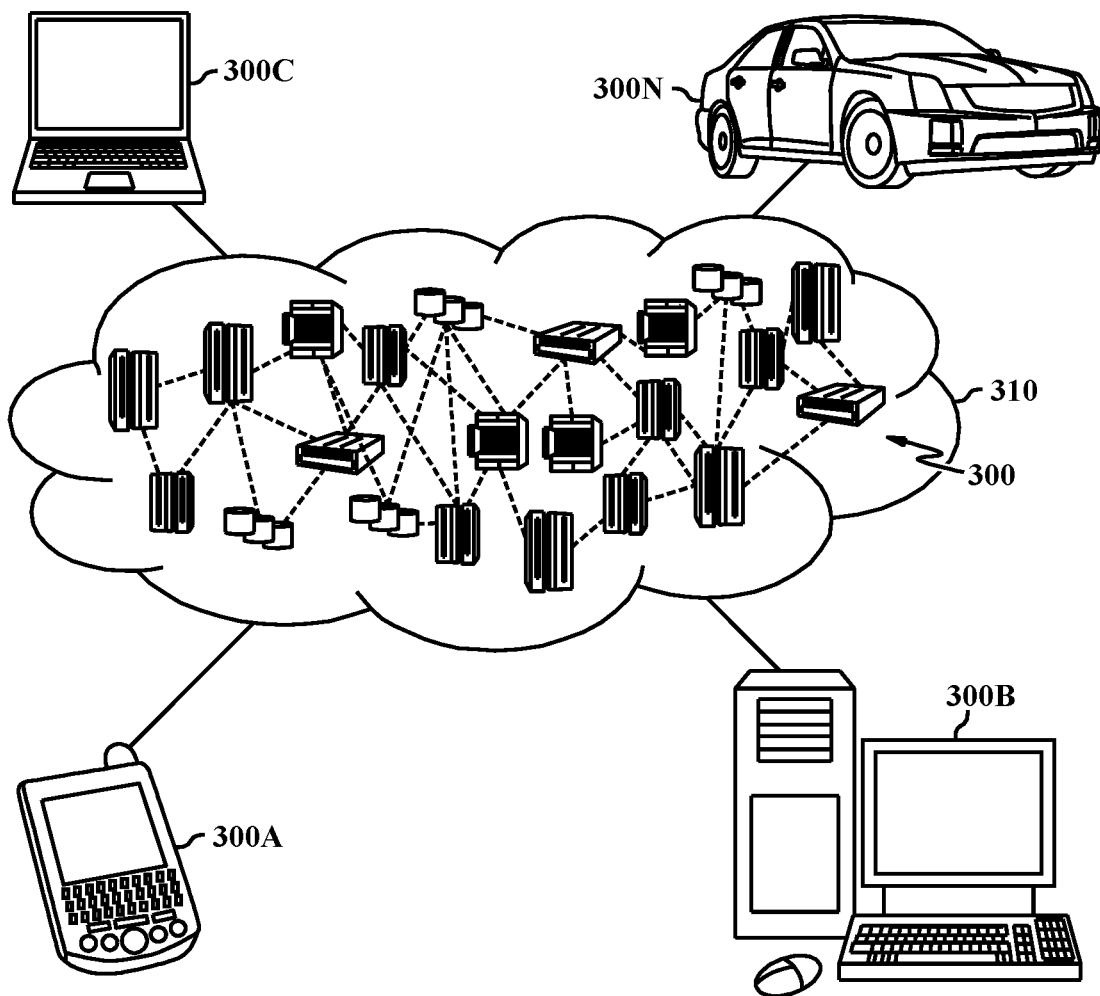
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
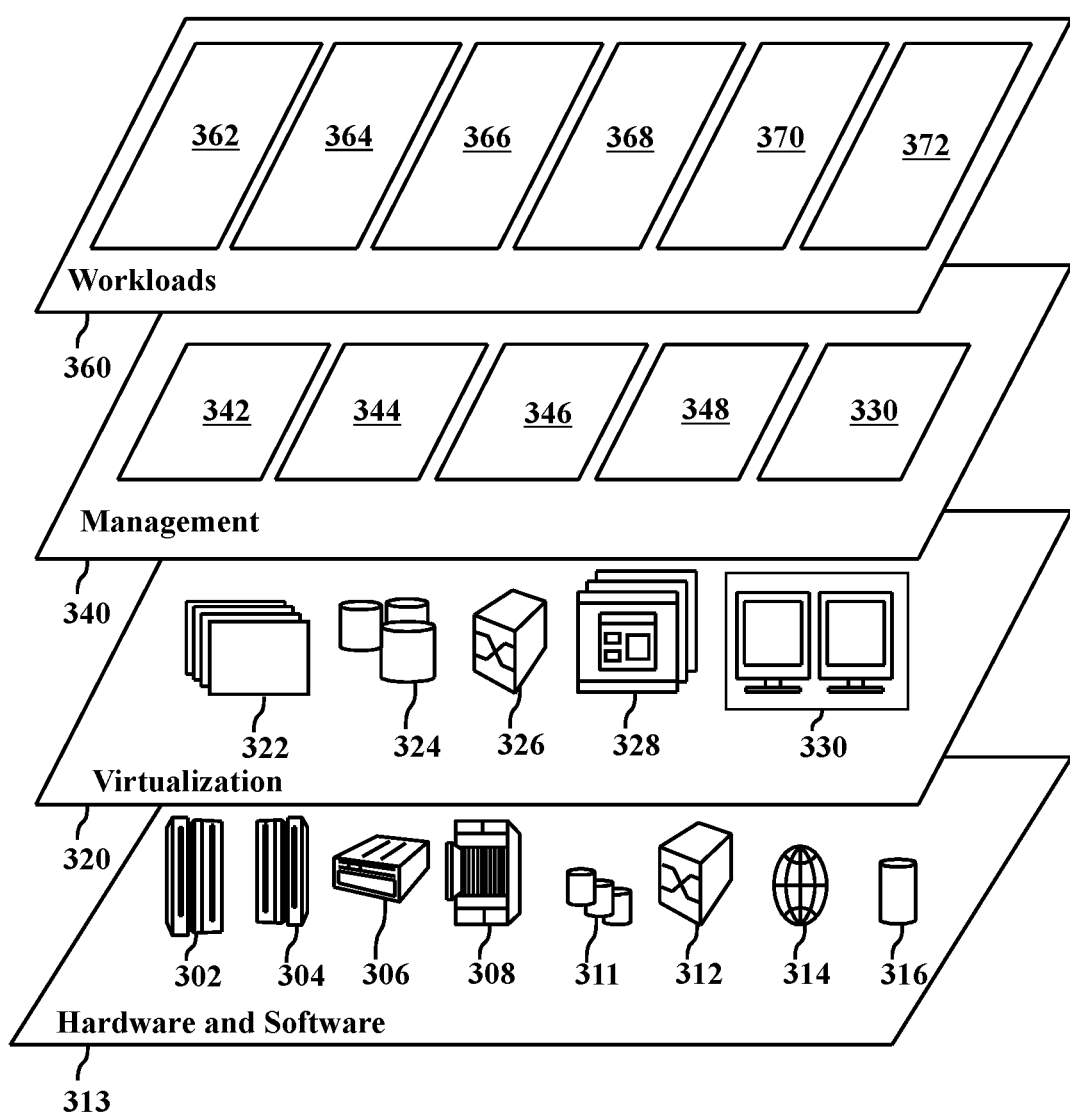
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and media data managing 372.

Figure 4:
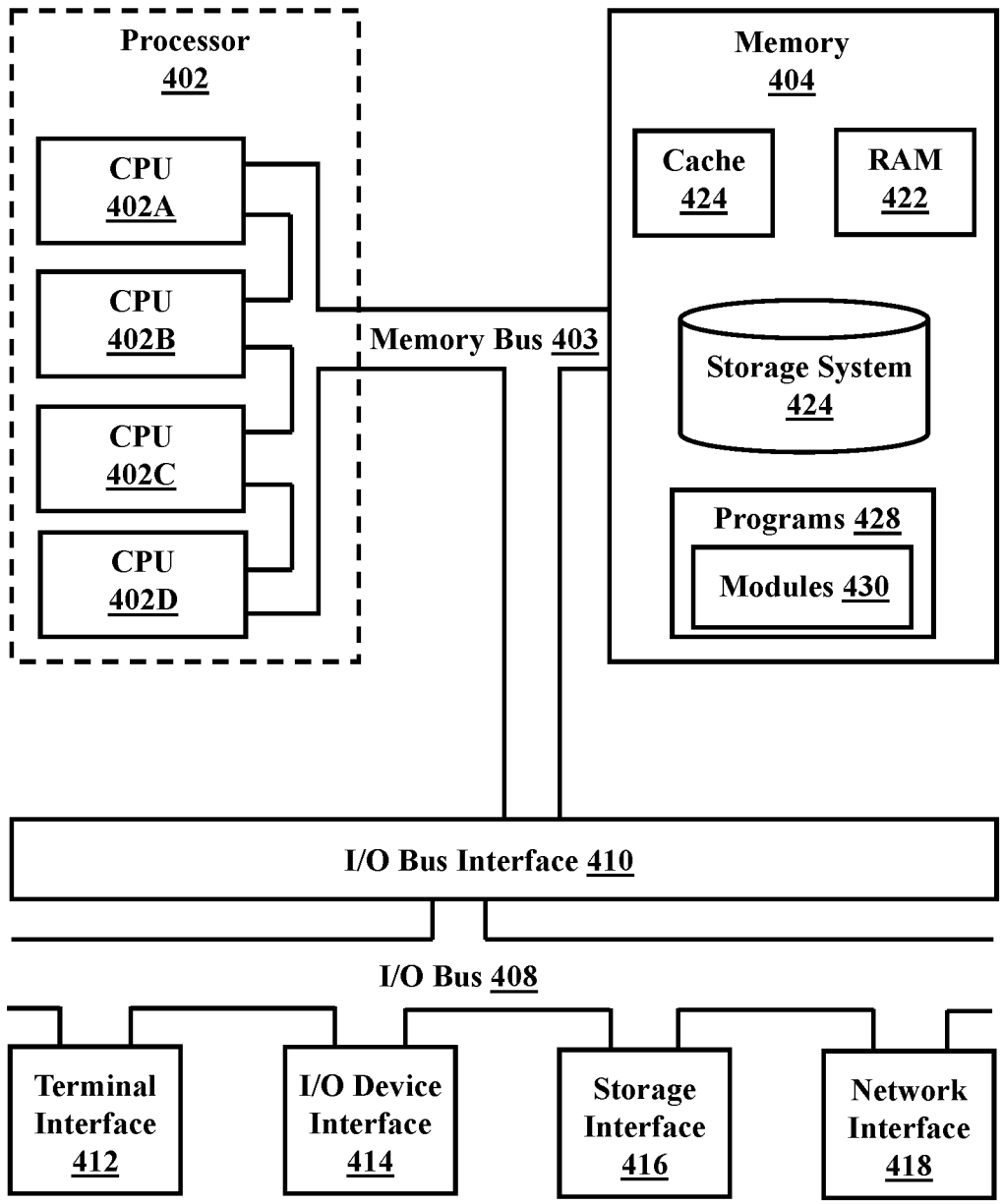
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for managing media modification within a participant network, the method comprising:
    generating, by a processor, the participant network having one or more participants, wherein the one or more participants are associated with one or more media data;
    enforcing one or more rules on the participant network using an artificial intelligence (AI) based governance system, wherein the one or more rules manage the modification of the one or more media data by the one or more participants;
    analyzing the one or more media data for authenticity, based on the one or more rules;
    determining one or more authenticity results of the one or more media data having one or more modifications made by the one or more participants over time;
    publishing the one or more authenticity results associated with the one or more modifications made to the one or more media data over time to the participant network; and
    restricting a participant of the one or more participants from modifying the one or more media data with a particular modification based, at least in part, on the AI based governance system and the one or more authenticity results.

2. The method of claim 1, further comprising:
automatically generating the one or more rules based, at least in part, on an AI rule engine.

3. The method of claim 1, further comprising:
analyzing a modification of the one or more media data performed by a participant; and
determining the modification of the one or more media data violates the one or more rules.

4. The method of claim 3, further comprising:
identifying the participant as an owner of the one or more media data; and
bypassing the one or more rules of the AI based governance system, wherein bypassing the one or more rules allows the owner to perform the modification.

5. The method of claim 3, further comprising:
generating an alert notification that the one or more rules has been violated by the participant.

6. The method of claim 1, further comprising:
generating an alert when the participant imports the one or more media data to an external system.

7. The method of claim 1, further comprising:
generating a validation summary associated with the one or more authenticity results and the one or more media data.

8. A system for managing media modification within a participant network, the system comprising:
a memory; and
a processor in communication with the memory, the processor being configured to perform operations comprising:
generating the participant network having a participant, wherein the participant is associated with one or more media data;
enforcing one or more rules on the participant network using an artificial intelligence (AI) based governance system, wherein the one or more rules manage the modification of the one or more media data by the one or more participants;
analyzing the one or more media data for authenticity, based on the one or more rules;
determining one or more authenticity results of the one or more media data having one or more modifications made by the one or more participants over time;
publishing the one or more authenticity results associated with the one or more modifications made to the one or more media data over time to the participant network; and
restricting a participant of the one or more participants from modifying the one or more media data with a particular modification based, at least in part, on the AI based governance system and the one or more authenticity results.

9. The system of claim 8, wherein the participant network includes:
archiving one or more actions associated with the participant and the one or more media using an immutable tracking component.

10. The system of claim 8, further comprising:
automatically generating the one or more rules based, at least in part, on an AI rule engine.

11. The system of claim 8, further comprising:
analyzing a modification of the one or more media data performed by a participant; and
determining the modification of the one or more media data violates the one or more rules.

12. The system of claim 11, further comprising:
identifying the participant as an owner of the one or more media data; and
bypassing the one or more rules of the AI based governance system, wherein bypassing the one or more rules allows the owner to perform the modification.

13. The system of claim 11, further comprising:
generating an alert that the one or more rules has been violated by the participant.

14. The system of claim 8, further comprising:
generating an alert when the participant imports the one or more media data to an external system.

15. A computer program product for managing media modification within a participant network, the computer program product comprising a computer readable storage medium having program instructions embodied therewith, the program instructions executable by a processor to cause the processors to perform a function, the function comprising:
generating the participant network having a participant, wherein the participant is associated with one or more media data;
enforcing one or more rules on the participant network using an artificial intelligence (AI) based governance system, wherein the one or more rules manage the modification of the one or more media data by the one or more participants;
analyzing the one or more media data for authenticity, based on the one or more rules;
determining one or more authenticity results of the one or more media data having one or more modifications made by the one or more participants over time;
publishing the one or more authenticity results associated with the one or more modifications made to the one or more media data over time to the participant network; and restricting a participant of the one or more participants from modifying the one or more media data with a particular modification based, at least in part, on the AI based governance system and the one or more authenticity results.

16. The computer program product of claim 15, wherein the participant network includes:
archiving one or more actions associated with the participant and the one or more media using an immutable tracking component.

17. The computer program product of claim 15, further comprising:
automatically generating the one or more rules based, at least in part, on an AI rule engine.

18. The computer program product of claim 15, further comprising:
analyzing a modification of the one or more media data performed by a participant; and
determining the modification of the one or more media data violates the one or more rules.

19. The computer program product of claim 18, further comprising:
identifying the participant as an owner of the one or more media data; and
bypassing the one or more rules of the AI based governance system, wherein bypassing the one or more rules allows the owner to perform the modification.

20. The computer program product of claim 18, further comprising:

generating an alert that the one or more rules has been violated by the participant.

\* \* \* \* \*